US011780711B2

(12) United States Patent
Kofman et al.

(10) Patent No.: US 11,780,711 B2
(45) Date of Patent: Oct. 10, 2023

(54) AUTOMATED TAGLINE CONTROL SYSTEM AND METHOD OF HANDLING A WIND TURBINE COMPONENT USING THE AUTOMATED TAGLINE CONTROL SYSTEM

(71) Applicant: Vestas Wind Systems A/S, Aarhus (DK)

(72) Inventors: Joris Kofman, Aalborg Øst (DK); Michael Egstrøm, Jordrup (DK)

(73) Assignee: Vestas Wind Systems A/S, Aarhus N (DK)

( * ) Notice: Subject to any disclaimer, the term of this patent is extended or adjusted under 35 U.S.C. 154(b) by 257 days.

(21) Appl. No.: 17/417,958

(22) PCT Filed: Dec. 18, 2019

(86) PCT No.: PCT/DK2019/050410
§ 371 (c)(1),
(2) Date: Jun. 24, 2021

(87) PCT Pub. No.: WO2020/135909
PCT Pub. Date: Jul. 2, 2020

(65) Prior Publication Data
US 2022/0089415 A1  Mar. 24, 2022

(30) Foreign Application Priority Data
Dec. 28, 2018 (DK) .......................... PA 2018 70873

(51) Int. Cl.
*B66C 13/00* (2006.01)
*B66C 13/08* (2006.01)
(Continued)

(52) U.S. Cl.
CPC .............. *B66C 13/08* (2013.01); *B66C 1/108* (2013.01); *B66C 23/185* (2013.01); *B66D 1/26* (2013.01); *B66D 1/485* (2013.01); *B66D 1/60* (2013.01)

(58) Field of Classification Search
CPC ......... B66C 13/06; B66C 13/08; B66C 13/22; B66C 13/46; B66C 1/108; B66C 1/24;
(Continued)

(56) References Cited

U.S. PATENT DOCUMENTS

2010/0135797 A1   6/2010  Nies
2014/0360015 A1  12/2014  Lohan et al.
(Continued)

FOREIGN PATENT DOCUMENTS

CN    101589226 A   11/2009
CN    103502636 A    1/2014
(Continued)

OTHER PUBLICATIONS

Danisih Patent and Trademark Office, Search and Examination Report in PA 2018 70873, dated Jun. 25, 2019.
(Continued)

*Primary Examiner* — Emmanuel M Marcelo
(74) *Attorney, Agent, or Firm* — Wood Herron & Evans LLP

(57) ABSTRACT

A tagline control system for handling a wind turbine component during an operation on a wind turbine using a lifting apparatus. The tagline control system includes a tagline control module (74, 164) having a housing (80), at least two winches (126,128) disposed within the housing and each having a tagline cable (130, 132), a controller (146) disposed within the housing and operatively coupled to the at least two winches, and a power source (148) disposed within the housing (80) and operatively coupled to the at least two
(Continued)

winches. A method of handling a wind turbine component during an operation on a wind turbine using the lifting apparatus includes coupling the tagline control module to the lifting apparatus and to a wind turbine component, and operating the tagline control system to effectuate the position of the wind turbine component.

24 Claims, 5 Drawing Sheets

(51) Int. Cl.
  *B66C 1/10*    (2006.01)
  *B66C 23/18*   (2006.01)
  *B66D 1/26*    (2006.01)
  *B66D 1/48*    (2006.01)
  *B66D 1/60*    (2006.01)

(58) Field of Classification Search
  CPC .... B66C 1/26; B66C 1/62; B66D 1/26; B66D 1/485; B66D 1/60; B66D 1/38; B66D 1/7405; B66D 3/26

See application file for complete search history.

(56) References Cited

U.S. PATENT DOCUMENTS

| | | |
|---|---|---|
| 2016/0200553 A1 | 7/2016 | Sorensen et al. |
| 2017/0067447 A1 | 3/2017 | Reynolds et al. |
| 2020/0141388 A1* | 5/2020 | Moeller ............... B66C 23/52 |
| 2021/0284506 A1* | 9/2021 | Moeller ............... F03D 13/10 |

FOREIGN PATENT DOCUMENTS

| | | |
|---|---|---|
| CN | 104743455 A | 7/2015 |
| CN | 108996405 A | 12/2018 |
| DE | 202010003269 U1 | 8/2011 |
| JP | 2001302184 A | 10/2001 |
| JP | 5746409 B1 | 7/2015 |
| WO | 2011048220 A1 | 4/2011 |
| WO | 2014076826 A1 | 5/2014 |
| WO | 2018086811 A1 | 5/2018 |
| WO | 2018228810 A1 | 12/2018 |

OTHER PUBLICATIONS

European Patent Office, International Search Report and Written Opinion in PCT Application No. PCT/DK2019/050410, dated Mar. 23, 2020.

China National Intellectual Property Administration, office action issued in corresponding Chinese application No. 201980092018.X, dated Apr. 29, 2023, with English translation.

* cited by examiner

AUTOMATED TAGLINE CONTROL SYSTEM AND METHOD OF HANDLING A WIND TURBINE COMPONENT USING THE AUTOMATED TAGLINE CONTROL SYSTEM

TECHNICAL FIELD

The invention relates generally to wind turbines, and more particularly to an automated tagline control system for handling of a wind turbine component during, for example, assembly of the wind turbine, and a method of handling a wind turbine component during assembly of the wind turbine using the automated tagline control system.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a central hub and a plurality of blades coupled to the hub and extending outwardly therefrom. The rotor is supported on a shaft extending from the nacelle, which shaft is either directly or indirectly operatively coupled with a generator which is housed inside the nacelle. Consequently, as wind forces the blades to rotate, electrical energy is produced by the generator.

In recent years, wind power has become a more attractive alternative energy source and the number of wind turbines, wind farms, etc., has significantly increased, both on land and off-shore. Additionally, the size of wind turbines has also significantly increased, with modern wind turbine blades extending between 50 to 80 meters in length and wind turbine towers exceeding 200 meters in height. It is expected that wind turbine components and wind turbine heights will continue to increase in size in the future. The increased size of wind turbine components, however, presents challenges during assembly of, disassembly of, or maintenance on the wind turbine. During assembly, disassembly or maintenance, a large-scale crane is typically brought to the wind turbine site to facilitate handling of the wind turbine components. In this regard, the crane is configured to lift various wind turbine components, including, for example, the nacelle, hub, and blades high in the air. The costs associated with the use of the large-scale crane are prohibitive and manufacturers continually strive to make efficient use of the crane during these operations.

In a conventional approach, control of wind turbine components during lifts by the large-scale crane is achieved using one or more taglines that extend from the lifted component to the ground. On the ground, service personnel manually grab the taglines and move them in a coordinated fashion to control the lifted wind turbine component and orient the component in a desired position. Due to the sheer size of modern wind turbine components, the extreme heights at which the wind turbine components are being raised in the air, and the significant wind speeds that exist at the raised heights, it often takes a large group of service personnel working in a coordinated manner to control and orient the wind turbine component. Additionally, due the large number of service personnel, which can be difficult to move in a coordinated manner, and the unpredictability of the wind at the heights required by modern wind turbines, the manual process of controlling and orienting the wind turbine components is time consuming. Thus, between the costs of the crane and the costs associated with the manual labor, the assembly, disassembly or maintenance of a wind turbine may be high.

Furthermore, the rigging associated with lifting a wind turbine component with a large-scale crane tends to be specific to the particular component being lifted. By way of example, the rigging, including the tagline arrangement, required to lift the nacelle to the top of the tower is generally different from the rigging required to lift the rotor hub or the wind turbine blades to the top of the tower. The change out of the rigging and taglines in order to lift the various wind turbine components is time consuming and thus prolongs the use of the large-scale crane. This in turn further increases the costs associated with wind turbine operations.

There have been some attempts in recent years to minimize the amount of manual labor required for controlling and orienting a component being lifted by a crane. Such approaches typically include a pulley arrangement mounted to the crane boom, winches mounted to the base of the crane and having control cables extending along the crane boom, around the pulleys, and to the component or yoke mounted to the component. Various controls for the winches may be located at the base of the crane, such as with the crane operator. Such systems, however, have their drawbacks. In this regard, the large-scale cranes must be modified to be specifically adapted for such a system and often include complicated carriage and pulley arrangements on the boom or other parts of the crane. Moreover, the components of the control systems are not self-contained but dispersed on the crane, including various elements on the crane boom, the base of the crane (e.g., the winches), and in the cab of the crane to facilitate control of the winches and control cables. Additionally, the rigging of the various control cables to the components may be specific to the particular wind turbine component being lifted by the crane.

In view of the high costs of crane usage and the drawbacks of conventional control strategies for handling a wind turbine component, a need exists for improved apparatus and methods for assembling, disassembling or repairing a wind turbine. More particularly, a need exists for a tagline control system that improves the handling of wind turbine components during crane operations and a method of using such a tagline control system to handle a wind turbine component during crane operations.

SUMMARY

To these and other ends, aspects of the invention are directed to a tagline control system for handling a wind turbine component during an operation on a wind turbine using a lifting apparatus. The tagline control module is configured to be positioned intermediate a connector of the lifting apparatus and the wind turbine component being lifted. The tagline control module includes a housing, at least two winches disposed within the housing, each winch having a tagline cable operatively coupled to the winch, a controller disposed within the housing and operatively coupled to the at least two winches, wherein the tagline cables of the winches are configured to be reeled in or paid out by their respective winches under the control of the controller, and a power source disposed within the housing and operatively coupled to the at least two winches.

In one embodiment, the tagline control system may further include a guide member, wherein the guide member is configured to be operatively coupled to the tagline cables of the tagline control module to effectuate a positional change in the wind turbine component during use. The guide member may include one or more guide cables or a guide rail. The guide member may further include a pulley block configured to traverse along a length of the one or more guide cables. In one embodiment, the guide member is configured to be coupled to the lifting apparatus. For example, the lifting apparatus may include a crane and the guide member may be configured to be coupled to one or more booms of the crane. In another embodiment, the guide member is configured to be coupled to the wind turbine. For example, the wind turbine may include a tower and a nacelle, and the guide member may be configured to be coupled to the tower or the tower and nacelle. In still a further embodiment, the guide member includes a first guide member portion configured to be coupled to the lifting apparatus and a second guide member portion configured to be coupled to the wind turbine. The tagline control module is configured to be operatively coupled to each of the first and second guide member portions.

In one embodiment, the tagline control module may further include a pair of arms extending from the housing and configured to engage with a respective tagline cable. The pair of arms may be selectively extendable and retractable relative to the housing. Preferably, the pair of arms are operatively coupled to the controller for controlling the extension and retraction of the arms.

In another embodiment, the tagline control system may further include one or more sensors configured to be coupled to the wind turbine component and in communication with the controller in the tagline control module. The one or more sensors are configured to communicate positional information of the wind turbine component to the controller. In this way, the tagline control system may adjust the position of the wind turbine component based on the readings from the one or more sensors. This may be configured as an automated process. A manual override mode may also be provided.

A method of handling a wind turbine component during an operation on a wind turbine using a lifting apparatus includes providing a tagline control system. The tagline control system includes a tagline control module and a guide member. The tagline control module includes a housing having at least two winches, each winch having a tagline cable operatively coupled thereto, a controller, and a power source. The method further includes coupling the tagline control module to a connector of the lifting apparatus and to the wind turbine component so that the tagline control module is positioned between the connector and the wind turbine component, coupling the guide member to a guide support, coupling the tagline cables to the guide member and operating the tagline control system to effectuate a positional change in the wind turbine component.

In one embodiment, the coupling of the guide member to a guide support may further include coupling one or more guide cables to the lifting apparatus. The lifting apparatus may include a crane having one or more booms, and the method may further include coupling the one or more guide cables to the one or more booms of the crane. In another embodiment, the coupling of the guide member to a guide support may further include coupling one or more guide cables to the wind turbine. The wind turbine may include a tower and a nacelle, and the method may further include coupling the one or more guide cables to the tower or to the tower and the nacelle. In still a further embodiment, the coupling of the guide member to a guide support may further include coupling one or more guide cables to the lifting apparatus and coupling one or more guide cables to the wind turbine.

In one embodiment, the tagline control module includes a pair of adjustable arms, wherein the arms are in engagement with a respective tagline cable. In this embodiment, the method further includes adjusting the length of the arms. This allows the distance between the tagline cables at the tagline control module to be varied. A greater distance between the tagline cables at the tagline control module may increase the amount of control that the tagline control module imposes on the wind turbine component.

In a further embodiment, the method may further include sensing a position of the wind turbine component and automatically adjusting the position of the wind turbine component in response to the sensing using the tagline control system. The step of sensing a position of the wind turbine component may further include placing one or more sensors on the wind turbine component and operatively coupling the one or more sensors to the controller in the tagline control module.

In one embodiment, the method may further include predefining a design criteria for the position of the wind turbine component and automatically adjusting the position of the wind turbine component to maintain or achieve the design criteria using the tagline control system. In a further aspect of the method, a plurality of design criteria may be stored in the controller and the design criteria may be selected from the plurality of design criteria stored in the controller. The tagline control system then operates to achieve or maintain the selected design criteria.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
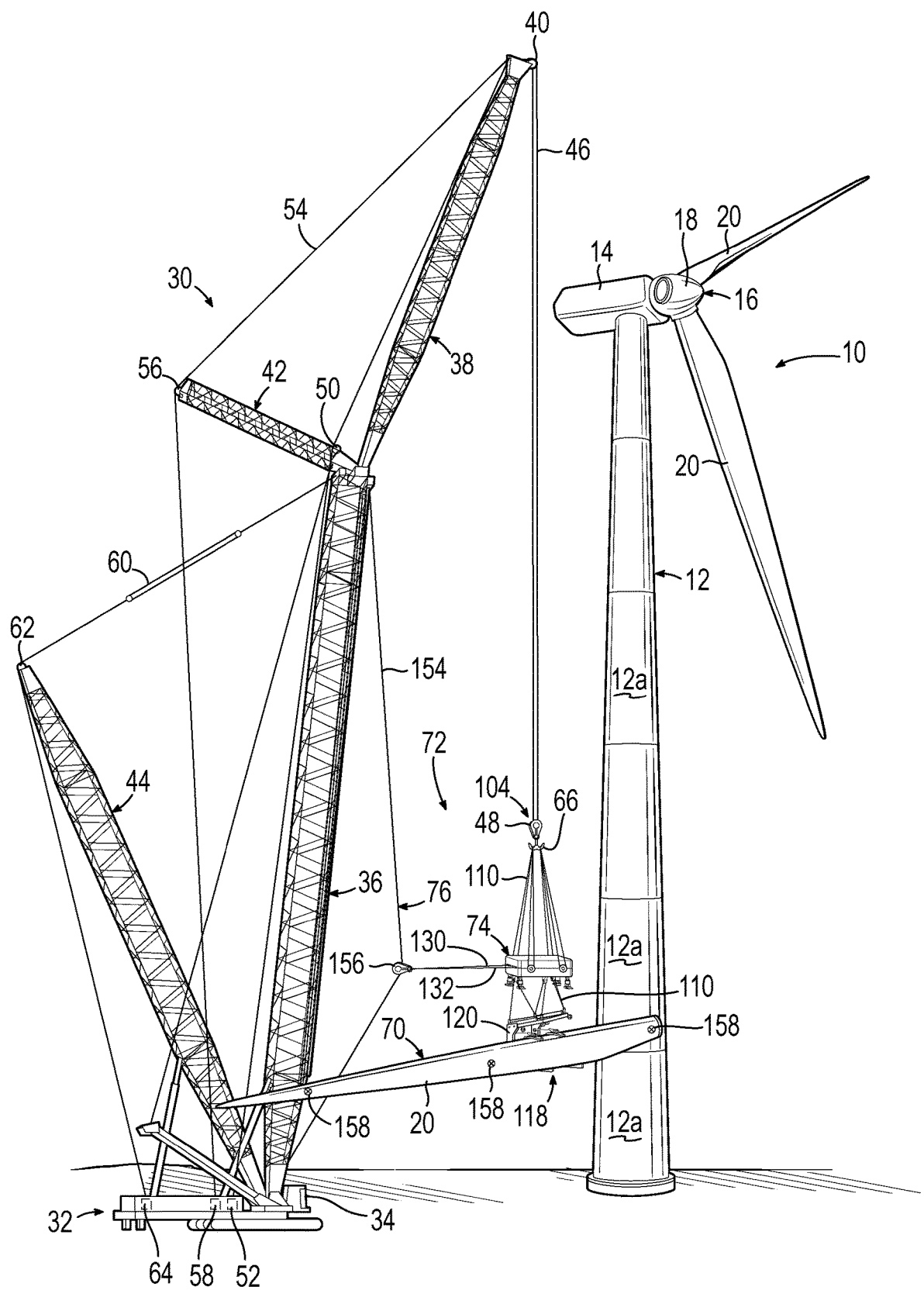
FIG. 1 is a diagrammatic perspective view of a wind turbine being assembled using a tagline control system in accordance with an embodiment of the invention.

With reference to FIG. 1, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a plane substantially perpendicular to the wind direction. The rotor 16 of wind turbine 10 includes a central hub 18 and at least one rotor blade 20 that projects outwardly from the central hub 18 at locations circumferentially distributed thereabout. In the representative embodiment, the rotor 16 includes three blades 20, but the number may vary. The blades 20 are configured to interact with the passing air flow to produce lift that causes the central hub 18 to spin about a central longitudinal axis.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

As illustrated in FIG. 1, the assembly of the wind turbine 10 may be achieved through the use of a large-scale crane 30 transported to the wind turbine installation site and which is capable of lifting heavy objects and maneuvering the heavy objects into a desired position. In this regard, the crane 30 is configured to lift the various wind turbine components, such as tower sections 12a of tower 12, the nacelle 14, the hub 18 and blades 20 during the assembly process. To this end, the crane 30 typically includes a base 32 supported on the ground, for example, and having a control cab 34 for holding a crane operator. A main boom 36 is movably coupled to base 32 at a first, lower end thereof and may have, for example, a generally latticed structure as is conventional in the art. A jib boom 38 has a first end that is movably coupled to the second, upper end of the main boom 36. The second end of the jib boom 38 includes a main sheave 40 rotatably coupled thereto for receiving the crane's rigging. A jib mast 42 may be pivotably coupled to the main boom 36 at the junction between the main boom 36 and the jib boom 38. A gantry 44 may also be movably coupled to the base 32.

The rigging for crane 30 includes a main load bearing cable 46 for supporting and hoisting the various wind turbine components. One end of the main load bearing cable 46 is connected to the jib boom 38. The other end of the main load bearing cable 46 is trained (i.e., routed or guided) through a sheave on a jib block 48, over the main sheave 40 on the second end of jib boom 38, over a second sheave 50 rotatably mounted on the jib mast 42, and connected to a main winch 52 supported on base 32. The rigging also includes a pendant cable 54 having one end connected to the jib boom 36, such as adjacent a second end thereof, and trained over a third sheave 56 rotatably mounted on the jib mast 42, and to a second winch 58 capable of reeling in and paying out pendant cable 54 in a controllable manner to move or adjust the angle of the jib boom 38. The rigging may further include a reeving 60 having an end connected to the main boom 36, such as adjacent a second end thereof, and trained over a fourth sheave 62 on the gantry 44, and to a third winch 64 for reeling in and paying out reeving 60 in a controllable manner to move or adjust the angle of the main boom 36. The jib block 48 may include a lifting hook 66 for facilitating a connection between the crane 30 and the wind turbine component 70 being lifted thereby.

Those of ordinary skill in the art will recognize that the above-described components of crane 30 are generally well known in the art and have been described herein to provide a complete description and understanding of aspects and features to be described below. Moreover, the description of crane 30 provided above is exemplary and those of ordinary skill in the art will recognize that a wide range of cranes or other lifting apparatus may be used in conjunction with aspects of the invention, and aspects of the invention are therefore not limited to the exemplary embodiment described herein.

As further illustrated in FIG. 1 and in accordance with one aspect of the present invention, control of the wind turbine component 70 being lifted by the crane 30 is facilitated by a tagline control system, generally shown at 72. While the particular wind turbine component 70 being lifted by the crane 30 is illustrated as a wind turbine blade 20, it should be appreciated that the wind turbine component 70 may take the form of a tower section 12a, the nacelle 16, the hub 18 or other component of the wind turbine 10. In an exemplary embodiment, the tagline control system 72 includes a tagline control module 74 and a guide member 76 operatively coupled to the tagline control module 74. As will be discussed in more detail below, the tagline control module 74 and the guide member 76 collectively facilitate control of the wind turbine component 70 as the component is being lifted by the crane 30. Furthermore, the tagline control module 74 and the guide member 76 collectively allow the position (e.g., the orientation) of the wind turbine component 70 to be selectively adjusted.

Figure 2:
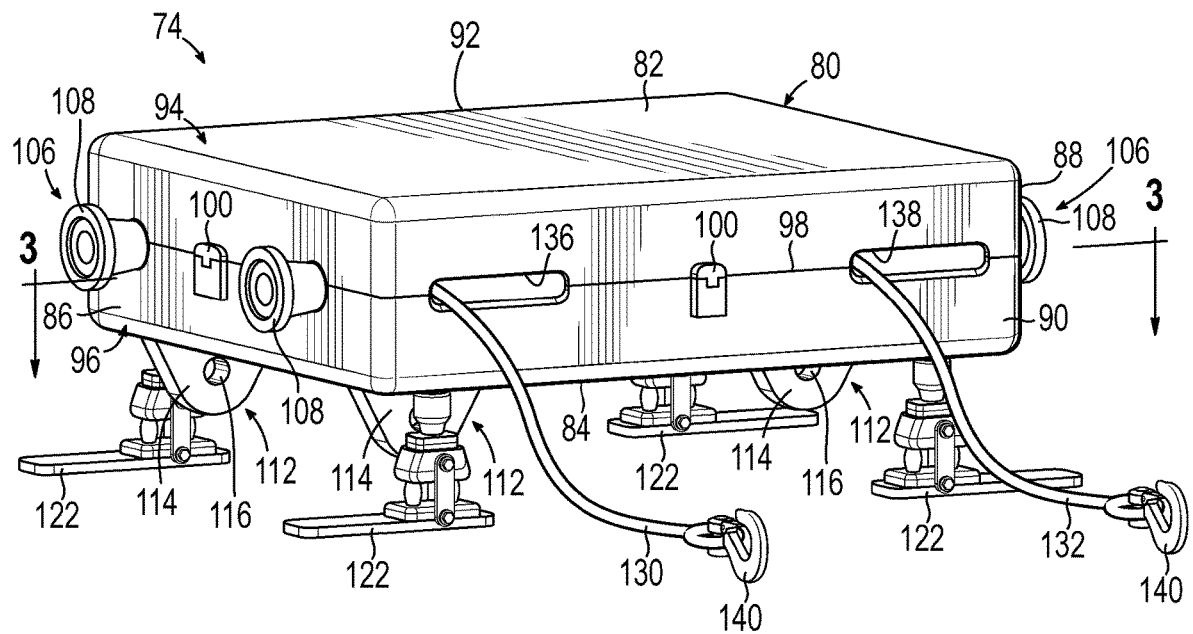
FIG. 2 is a perspective view of tagline control module in accordance with one embodiment of the invention.
Figure 3:
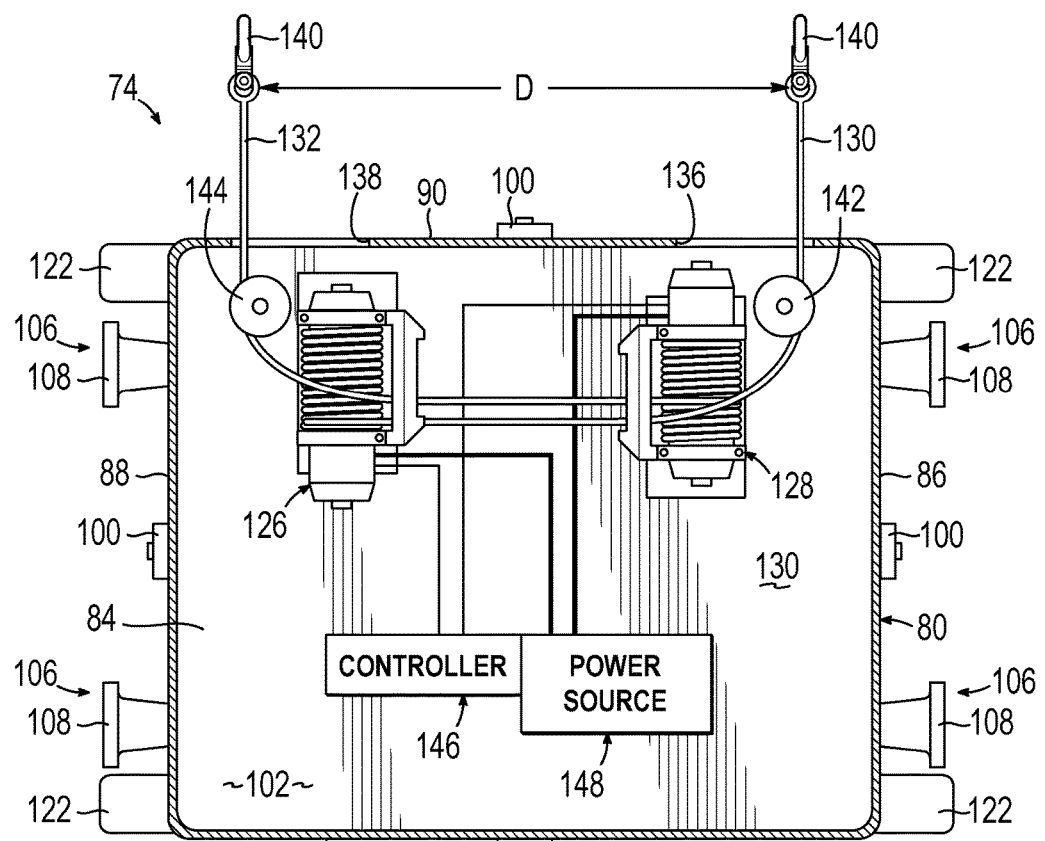
FIG. 3 is a cross-sectional view of the tagline control module shown in FIG. 2 generally taken along line 3-3.

As illustrated in FIGS. 2 and 3, the tagline control module 74 includes a generally rectangular housing 80 having a generally planar upper wall 82, lower wall 84, side walls 86, 88, front wall 90 and rear wall 92. The housing 80 has a shell construction including an upper shell 94 and a lower shell 96 that mate along an interface 98 in a closed configuration of the housing. One or more latches 100 may selectively maintain the housing in the closed configuration. The latches 100 may be released so that the upper shell 94 may be removable from the lower shell 96 and thereby provide an open configuration for the housing 80. In this way, various components (discussed below) positioned within an interior cavity 102 of the housing 80 may be accessible to service personnel or the like. In a preferred embodiment, the housing 80 may be made from a durable metal, such as aluminum or steel. Alternatively, however, the housing 80 may be made from various plastic materials such as ABS, polycarbonates, nylons, polyamides, polyetheretherketones, and other engineering plastics. Furthermore, while the housing 80 is described herein as having a generally rectangular configuration, aspects of the invention are not limited to such an arrangement, as the housing may take other shapes and configurations.

As illustrated in FIG. 1, in an exemplary embodiment, the tagline control module 74 is preferably positioned between the crane connector 104, such as the crane lifting hook 66 or other similar crane connection interfaces, and the particular wind turbine component 70 being handled by the crane 30. As such, the tagline control module 74 includes a crane connection interface 106 that facilitates a connection between the tagline control module 74 and the crane connector 104 of the crane 30. By way of example, the crane connection interface 106 may include one or more trunnions 108 secured to the housing 80. In one embodiment, two trunnions 108 extend from each of the side walls 86, 88. Such an arrangement provides a well-balanced distribution of the crane connection interface 106 on the housing 80. Other arrangements of the trunnions 108, however, are also possible. For example, trunnions 108 may extend from other walls of the housing 80. Other crane connection interfaces 106, such as various hooks, hubs, etc. may also be used to couple the tagline control module 74 to the crane 30. Accordingly, aspects of the invention should not be limited to the particular arrangement illustrated in the figures. In any event, one or more connectors may couple the trunnions 108 with the lifting hook 66 of the crane 30. For example, various flexible connectors 110, such as slings, straps, ropes, chains, etc., may extend between the trunnions 108 on the tagline control module 74 and the lifting hook 66 of the crane 30, as is illustrated in FIG. 1.

Additionally, the tagline control module 74 includes a component connection interface 112 that facilitates a connection between the tagline control module 74 and the wind turbine component 70. By way of example, the component connection interface 112 may include one or more tabs 114 secured to the housing 80, with each tab 114 including a hole or bore 116 for receiving a fastener, such as a bolt, hook, clamp, etc. In one embodiment, four tabs 114 extend from the lower wall 84 with a well-balanced distribution of the component connection interface 112 on the housing 80. It should be recognized, however, that other arrangement of the tabs 114 may also be possible, including having the tabs 114 extend from other walls of the housing 80. Other component connection interfaces 112 may also be possible.

In any event, the one or more tabs 114 are configured to couple the wind turbine component 70 to the tagline control module 74. The coupling may be directly to the wind turbine component 70 or indirectly via additional support elements disposed between the tagline control module 74 and the wind turbine component 70. In this regard, many of the wind turbine components 70 lifted by the crane 30 may include a component-specific support frame 118. For example, as illustrated in FIG. 1, to facilitate the lifting of a wind turbine blade 20, a blade gripper 120 may be mounted to the blade and interface with the blade in a manner that not only supports the blade, but also minimizes the damage to the blade as a result of the lift. In this case, the tabs 114 on the tagline control module 74 may be coupled to the blade gripper 120 via one or more connectors 110 such as slings, straps, ropes, chains, etc. Blade grippers 120 are generally well known in the industry and thus will not be described in further detail herein. In another embodiment, a yoke of some type may support the wind turbine component 70 during a crane lift, i.e., the yoke operates as the support frame 118 for the wind turbine component being lifted. In this case, the tabs 114 on the tagline control module 74 may be coupled to the yoke via one or more connectors 110 such as slings, straps, ropes, chains, etc. Those of ordinary skill in the art may recognize other support elements, depending on the particular wind turbine component 70 being raised by the crane 30, and understand how to couple the tagline control system 74 to such support elements.

As illustrated in FIG. 2, the tagline control module 74 also includes one or more support feet 122 for supporting the tagline control module 74 on the ground, ship deck or other support surface. Four such support feet 122 are shown, but the particular number may differ. The support feet 122 extend below the tabs 114 such that the feet are first to engage with a support surface. In one embodiment, the support feet 122 may have shock-absorbing capabilities.

As discussed above, many prior tagline systems have various elements dispersed about the crane. For example, winches for controlling the taglines of often located on the base of the crane while the winch controllers are integrated into the main cabin of the crane. The cranes then are individually modified for a specific purpose. In one aspect of the present invention, many of the elements of the tagline control system 72 are contained within the housing 80 of the tagline control module 74. As explained in more detail below, the winches, controller, energy source, etc. may all be located in the interior cavity 102 of the housing 60. In this way, the tagline control system 72 is a self-contained system that is easily incorporated into the overall assembly process of the wind turbine 10 by the large-scale crane 30. In other words, the tagline control system 72 may be implemented with a wind range of cranes and a wide range of wind turbine components 70 with minimal modifications and set up. The "localization" of the tagline control system 72 provides many benefits to service personnel during the assembly of the wind turbine 10. The benefits include not only those provided above directed to crane implementation, but also include maintenance and more focused design performance. Thus, concentrating many of the elements of the tagline control system 72 within a single, self-contained housing 80 is believed to be particularly advantageous.

With this in mind, FIG. 3 illustrates the various components of the tagline control system 72 contained within the housing 80 of the tagline control module 74. In this regard, the tagline control module 74 includes at least two winches 126, 128 secured to the inner surface 130 of the lower wall 84 and adjacent the front wall 90 of the housing 80. The winches 126, 128 may be standard winches which are readily commercially available and known to those of ordinary skill in the art. Accordingly, a further description of the winches 126, 128 will not be provided herein. Each of the two or more winches 126, 128 includes a tagline cable 130, 132, respectively, associated therewith and capable of being reeled in or paid out under the actuation of the respective winches 126, 128. The tagline cables 130, 132 extend through respective openings or slots 136, 138 in the front wall 90 and terminate at a fastener 140, which may take the form of a clip, hook, ring, clamp, or other type of cable connector known in the art. To guide the tagline cables 130, 132 through their respective slots 136, 138, one or more pulleys (two shown) 142, 144 may be provided and positioned within the interior cavity 102 of the housing 80 to facilitate the movement of the tagline cables 130, 132 through the slots 136, 138.

To control the operation of the winches 126, 128, an on-board controller 146 is provided in the internal cavity 102 of the housing and is operatively coupled to each of the two or more winches 126, 128. The controller 146 may represent any computer, computer system, or programmable device recognized by a person having ordinary skill in the art and capable of carrying out the functions described herein, as will be understood by those of ordinary skill in the art. Controller 146 typically includes at least one processor coupled to a memory. The processor may represent one or more processors (e.g., microprocessors), and memory may represent the random access memory (RAM) devices comprising the main storage of the controller 146, as well as any supplemental levels of memory, e.g., cache memories, non-volatile or backup memories (e.g. programmable or flash memories), read-only memories, etc. In addition, memory may be considered to include memory storage physically located elsewhere in controller 146, e.g., any cache memory in the processor, as well as any storage capacity used as a virtual memory, e.g., as stored on a mass storage device.

The controller 146 may be coupled with a user interface configured to receive a number of inputs and outputs for communicating information externally. For interaction with a user or operator, the user interface typically includes one or more user input devices (e.g., a keyboard, a mouse, a trackball, a joystick, a touchpad, a keypad, a stylus, and/or a microphone, among others) and a display (e.g., a CRT monitor or an LCD display panel, among others).

Controller 146 operates under the control of an operating system, and executes or otherwise relies upon various computer software applications, components, programs, objects, modules, data structures, etc. In general, the routines executed by the controller 146 to operate the tagline control system 72, whether implemented as part of an operating system or a specific application, component, program, object, module or sequence of instructions will be referred to herein as "computer program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. The controller 146 includes digital and/or analog circuitry that interfaces the processor with the winch motor for the winch drum of the winches 126, 128.

In furtherance of the self-contained aspect of the tagline control module 74, the housing 80 further includes a power source 148 carried within the internal cavity 102 of the housing 80 and configured to power the winches 126, 128 to selectively reel in or pay out the tagline cables 130, 132. The inclusion of the power source 148 within the housing 80 itself is in contrast to many prior tagline control systems. In this regard, since the winches typically associated with taglines require power, the winches have traditionally been positioned at the base of the crane, where power is readily available. Aspects of the present invention overcome this limitation (which results in crane-specific applications) by locating the power source 148 within the self-contained housing 80 of the tagline control module 74. As a result, the tagline control system 72 described herein may be used with a greater variety of cranes or other lifting apparatus and in a simplified manner.

In an exemplary embodiment, the power source 148 may be a battery pack having sufficient stored energy to power the winches 126, 128 during at least one, and preferably during a plurality of wind turbine component lifts. Preferably, the batteries in the battery pack may be of the rechargeable type. Such batteries are known to those of ordinary skill in the art and will not be described further herein. In an alternative embodiment, the power source 148 may take the form of a generator. By way of example, the generator may include a fuel tank for powering a motor that generates the necessary electricity for powering the winches 126, 128 during lifts of wind turbine components 70. Those of ordinary skill in the art may recognize other power sources suitable for the present application. It is preferred, however, that any alternative power sources are contained within the housing 80 of the tagline control module 74 itself. Accordingly, power does not have to be transmitted to the winches 126, 128 in the tagline control module 74 from an external power source (such as the crane) but is provided locally within the housing 80 itself.

As discussed above, the tagline control system 72 also includes at least one guide member 76 configured to cooperate with the tagline control module 74 to achieve sufficient control over and orientation of the wind turbine component 70 being lifted by the crane 30. From a broad perspective, the guide member 76 transmits the forces of the tagline cables 130, 132 to a support to provide the counter forces that allow manipulation of the tagline cables 130, 132 to affect the position of the wind turbine component 70. In an exemplary embodiment, and as illustrated in FIG. 1, the guide member 76 may include one or more guide cables 154 that extend generally vertically in the air and adjacent to the wind turbine 10 being assembled. The one or more guide cables 154 may, in turn, be coupled to a guide support sufficient to withstand the forces and loads expected to be experienced by the tagline control system 72. In an exemplary embodiment, the guide support for the one or more guide cables 154 may be provided by the crane 30 itself. For example, as illustrated in FIG. 1, the one or more guide cables 154 may be coupled to one or more of the booms of the crane 30. As illustrated, the one or more guide cables 154 may be coupled to the main boom 36 of the crane 30. The guide member 76 may further include a pulley block 156 associated with the one or more guide cables 154 and configured to traverse the longitudinal length of the one or more guide cables 154 during use. As shown in FIG. 1, the ends of the tagline cables 130, 132 are configured to be removably coupled to the pulley block 156 and thereby operatively couple the tagline control module 74 to the guide member 76.

Aspects of the invention are not limited to the particular arrangement shown in FIG. 1. In this regard, the one or more cables 154 may be coupled to more than one of the booms of the crane 30. For example, in an alternative embodiment (not shown) the lower end of the one or more cables 154 may be coupled to the main boom 36 while an upper end of the one or more cables may be coupled to the jib boom 38. It should be appreciated that the one or more cables 154 may be coupled to the crane 30 in a sufficient manner to engage with the tagline cables 130, 132 when the wind turbine component 70 is at its lowest position, e.g., for coupling to the crane, and at its desired assembly position on the wind turbine 10. Thus, aspects of the invention are not limited to that shown in FIG. 1. Additionally, the guide member 76 should not be limited to one or more guide cables. In this regard and in an alternative embodiment (not shown), the guide member 76 may include a guide rail that extends generally vertically in the air and adjacent to the wind turbine 10 being assembled. The guide rail may, for example, include a beam (e.g., an I beam) that is attached to one or more booms of the crane 30. The tagline cables 130, 132 may be coupled to the beam, such as through, for example, a carriage movably attached to the beam and configured to traverse the length of the beam. Those of ordinary skill in the art may recognize other flexible or rigid elongate members that may operate as the guide member 76.

Figure 4:
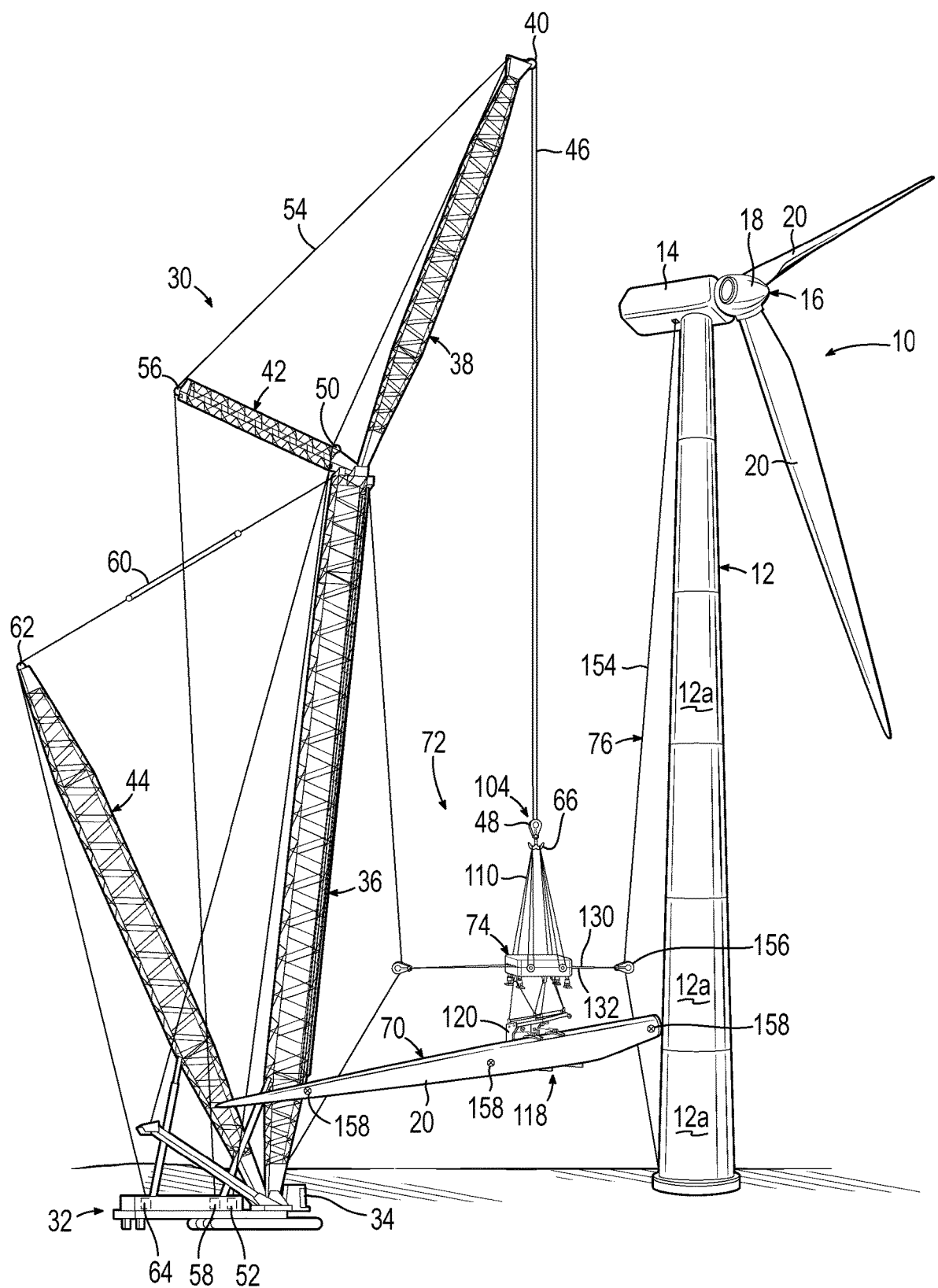
FIG. 4 is a diagrammatic perspective view of a wind turbine being assembled using a tagline control system in accordance with another embodiment of the invention.
Figure 5:
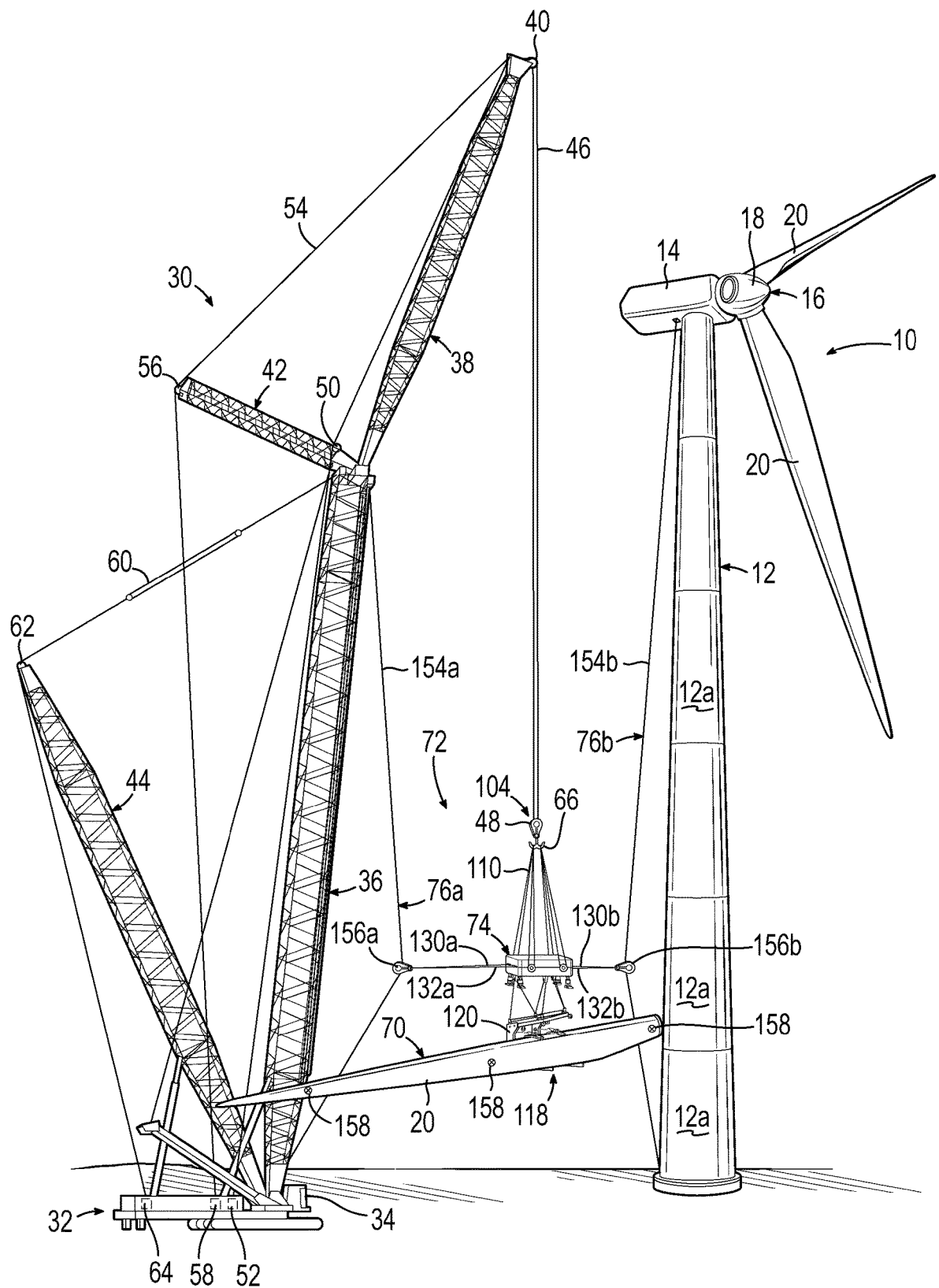
FIG. 5 is a diagrammatic perspective view of a wind turbine being assembled using a tagline control system in accordance with another embodiment of the invention.

Use of the tagline control system 72 will now described in reference to FIGS. 1, 4 and 5. In an initial step, the tagline control module 74 may be coupled to the rigging of the crane 30. More particularly, the tagline control module 74 may be coupled to the jib block 48 of the main load cable 46 of the crane 30 via the lifting hook 66. In this regard, and as discussed above, flexible connectors 110 may be used to couple the trunnions 108 of the tagline control module 74 to the lifting hook 66 of the crane 30 such that the tagline control module 74 is suspended by the crane 30 and movable with the lifting hook 66 through actuation of the crane 30. In addition, the guide member 76 may be positioned adjacent to the wind turbine 10 and coupled to a guide support.

In the embodiment shown in FIG. 1, the guide support is provided by the crane 30. Thus, a lower end of the one or more guide cables 154 may be coupled to the crane 30 adjacent the crane base 32. For example, the one or more guide cables 154 may be coupled to a lower end of the main boom 36. An upper end of the one or more guide cables 154 may similarly be coupled to the crane 30 at a location adjacent to where the wind turbine component 70 is to be coupled to the wind turbine 10. For example, the one or more guide cables 154 may be coupled to the crane 30 at an upper end of the main boom 36. Thus, the crane boom 36 provides the necessary support and load transfer capabilities to accommodate the forces generated by the tagline control module 74 during use. The ends of the tagline cables 130, 132 may be coupled to the pulley block 156 that is movably coupled to the one or more guide cables 154. With vertical movement of the tagline control module 74 under actuation of the crane 30, the pulley block 156 will move along the one or more guide cables 154.

With this arrangement, the tagline control module 74 may be positioned adjacent to the wind turbine component 70 being lifted by the crane 30. This position may be adjacent, for example, the ground, deck of a ship, etc. As noted above, the wind turbine component 70 will typically have a support frame 118 for supporting the component 70. In the embodiment of FIG. 1, the wind turbine component 70 being lifted by the crane 30 is a wind turbine blade 20 and the support frame 118 takes the form of a blade gripper 120. In this case, the tagline control module 74 may be coupled to the blade gripper 120 at suitable lifting points on the blade gripper 120. In this regard, flexible connectors 110 may be used to couple the tabs 114 of the tagline control module 74 to the blade gripper 120 associated with the wind turbine blade 20. The crane operator may then actuate the crane 30 to initially lift the wind turbine component 70 off the ground. As further noted above, the tagline control module 74 is positioned between the crane hook 66 and the wind turbine component 70 being lifted by the crane 30. The connection of the tagline cables 130, 132 to the guide member 76, in this case one or more guide cables 156, allows the tagline control module 74 to adjust the position of the wind turbine component 70 through manipulation of the tagline cables 130, 132.

To this end and in one aspect of the present invention, the control of the wind turbine component 70 by the tagline control module 74 during the lifting by the crane 30 may be an automated process. In this regard, one or more position sensors 158 may be coupled to the wind turbine component 70 (either on the component 70 itself and/or on the support frame 118 associated with the component 70) and configured to be in communication with the controller 146 in the tagline control module 74. For example, the sensors 158 may be configured to wirelessly communicate with the controller 146 through Bluetooth or other wireless communication protocol. The position sensors 158 may include a wide variety of sensors that indicate position of the wind turbine component, including without limitation height, inclination, twist, yaw and/or other position and orientation variables. For example, these sensors may include various tilt sensors (e.g., inclinometers), GPS sensors, direction sensors e.g. based on magnetism, or other sensors known to those of ordinary skill in the art.

The controller 146 of the tagline control module 74 may be configured to receive the signals from the position sensors 158 and actuate one or both of the winches 126, 128, and thereby their associated tagline cables 130, 132, to adjust the position of the wind turbine component 70 in accordance with the operation protocol. By way of example, the controller 146 may be configured to adjust the tagline cables 130, 132 so that the wind turbine component 70 substantially maintains a certain yaw (referred to as the design criterion) relative to, for example, the rotor hub 18 to which the blade 20 is being attached. The design criterion is typically known or predetermined prior to the crane lift and may depend on the particular wind turbine component 70 being lifted by the crane 30. In any event, the controller 146 and sensors 158 may be programmed with the design criterion such that the tagline control module 74 may take readings from the sensors 158 and operate the tagline control module 74 to maintain or achieve the design criterion. In this regard, the controller 146 may be configured to store, such as in memory, a plurality of various design criteria such that a user may select the design criterion from a library of pre-programmed criteria. The controller 146 may be configured to allow a user to select the type of wind turbine component 70 being lifted (such as from a pull-down menu) and the particular design criterion for that component. A specified yaw position is but one possible design criterion to which the tagline control module 74 may be configured to maintain or achieve during a crane lift. The invention, however, is not so limited as a wide variety of design criteria may be possible within the scope of the invention.

In addition to the automated process described above, the tagline control system 72 may be augmented with a manual override mode that allows service personnel to control the tagline control module 74 to adjust the position of the wind turbine component 70. To this end, service personnel on the ground, or possibly in or on the wind turbine 10, may have a remote controller (not shown) capable of actuating the winches 126, 128 in the tagline control module 74 to adjust the position of the wind turbine component 70. This type of manual override may be desirable near the end of the lifting process, such as right before the wind turbine component 70 is attached to the wind turbine 10, to make slight adjustments in position that facilitates the connection of the wind turbine component 70 to the wind turbine 10.

Through the use of the tagline control system 72, control over the wind turbine component 70 may be maintained during the lift (e.g., from the ground to the top of the wind turbine 10) and the component 70 may be positioned in the desired orientation for connection to the wind turbine 10 at the top of the lift. This positioning of the wind turbine component 70 may be achieved without a host of taglines extending from the wind turbine component to the ground or a large group of service personnel on the ground that must work in a coordinated manner to maintain control during the lift and achieve the desired orientation when the wind turbine component 70 reaches its position for assembly to the wind turbine 10. Another benefit of the present invention is that the tagline control system 72 may be used on a wide variety of wind turbine components 70. Thus, for example, the tagline control system 72 may be used in the lift of the nacelle 14, hub 18 and blades 20. Specific rigging depending on what wind turbine component is being lifted by the crane 30 is no longer needed. The tagline control module 74 is configured to interface with, for example, each of the wind turbine components 70 listed above either directly, through a support frame, or via a yoke. This versatility in the tagline control system 72 reduces the rigging setup time to achieve a lift of several different wind turbine components. Accordingly, more efficient use of the large-scale crane may be achieved, and operating costs may be reduced as a result of aspects of the present invention.

Another embodiment of the present invention is illustrated in FIG. 4, in which like reference numbers refer to like features shown and described in reference to FIG. 1. The embodiment shown in FIG. 4 is similar to that shown in FIG. 1 and thus only the differences will be described in further detail. In this regard, the primary difference relative to the embodiment shown in FIG. 1 is directed to the configuration of the guide member 76. In FIG. 1, the guide support for the guide member 76 was provided by the crane 30, and more particularly the main boom 36 of the crane 30. Due to the heavy weight of the various wind turbine components 70 being lifted by the crane 30, the crane booms 36, 38 are under significant load during use. Coupling the guide member 76 to the crane booms only further increases the loads being experienced by the crane 30. To ensure that the crane is capable of handling the increased loads, oversized cranes must be used to accommodate the increased loads due to the tagline control system 72.

As illustrated in FIG. 4, however, this increased load burden due to the tagline control system 72 may be taken off of the crane 30 and put on the wind turbine 10, and more particularly on the wind turbine tower 12. In this embodiment, the guide member 76 may include one or more guide cables 154. A lower end of the one or more guide cables 154 may be attached to a lower end of the wind turbine tower 12, to the foundation of the wind turbine, or to a post or support fixed in the ground adjacent the base of the tower 12. An upper end of the one or more guide cables 154 may be attached to an upper end of the wind turbine tower 12 or alternatively to the nacelle 14. For example, a removable collar or clamp (not shown) may be provided adjacent the top of the tower 12 to which the upper end of the one or more guide cables 154 may be attached. The guide member 76 may further include a pulley block 156 associated with the one or more guide cables 154 and configured to traverse the longitudinal length of the one or more guide cables 154. As shown in FIG. 4, the ends of the tagline cables 130, 132 are configured to be removably coupled to the pulley block 156. Operation of the tagline control system 72 illustrated in FIG. 4 is similar to that described above in regard to FIG. 1. The primary difference is that the forces generated by the tagline control system 72 are now borne by the wind turbine 10 and not the crane 30. This makes the modifications of the crane 30 even less obtrusive and makes the tagline control system 72 applicable to a broader range of cranes.

A further embodiment of the present invention is illustrated in FIG. 5, in which like reference numbers refer to like features shown and described in reference to FIG. 1. The embodiment shown in FIG. 5 is similar to that shown in FIGS. 1 and 4 and thus only the differences will be described in further detail. In this regard, the primary difference relative to the embodiments shown in FIGS. 1 and 4 is directed to the configuration of the guide member 76. More particularly, the embodiment shown in FIG. 5 is a combination of that shown in FIGS. 1 and 4. In this regard, the tagline control system 72 includes two guide members 76a, 76b. The first guide member 76a may include one or more guide cables 154a having a lower end coupled to the main boom 36 adjacent a lower end thereof and an upper end coupled to the main boom 36 adjacent an upper end thereof. The guide member 76a may further include a pulley block 156a associated with the one or more guide cables 154a and configured to traverse the longitudinal length of the one or more guide cables 154a. The ends of the tagline cables 130a, 132a are configured to be removably coupled to the pulley block 156a and operated by a pair of winches (not shown) in the tagline control module 74 under the command of the controller 146.

In a similar manner, the guide member 76b may include one or more guide cables 154b. A lower end of the one or more guide cables 154b may be attached to a lower end of the wind turbine tower 12, to the foundation of the wind turbine, or to a post or support fixed in the ground adjacent the base of the tower 12. An upper end of the one or more guide cables 154b may be attached to an upper end of the wind turbine tower 12 or alternatively to the nacelle 14. The guide member 76b may further include a pulley block 156b associated with the one or more guide cables 154b and configured to traverse the longitudinal length of the one or more guide cables 154b. The ends of the tagline cables 130b, 132b are configured to be removably coupled to the pulley block 156b and operated by a second pair of winches (not shown) in the tagline control module 74 under the command of the controller 146. Operation of the tagline control system 72 illustrated in FIG. 5 is similar to that described above in regard to FIG. 1. The primary difference is that the forces generated by the tagline control system 72 are borne by both the crane 30 and the wind turbine 10. Due to the reduced loads imposed on the crane 30 by sharing the tagline control system loads with the tower 12, a smaller crane may be used to assemble the wind turbine components 70 to the wind turbine 10.

Figure 6:
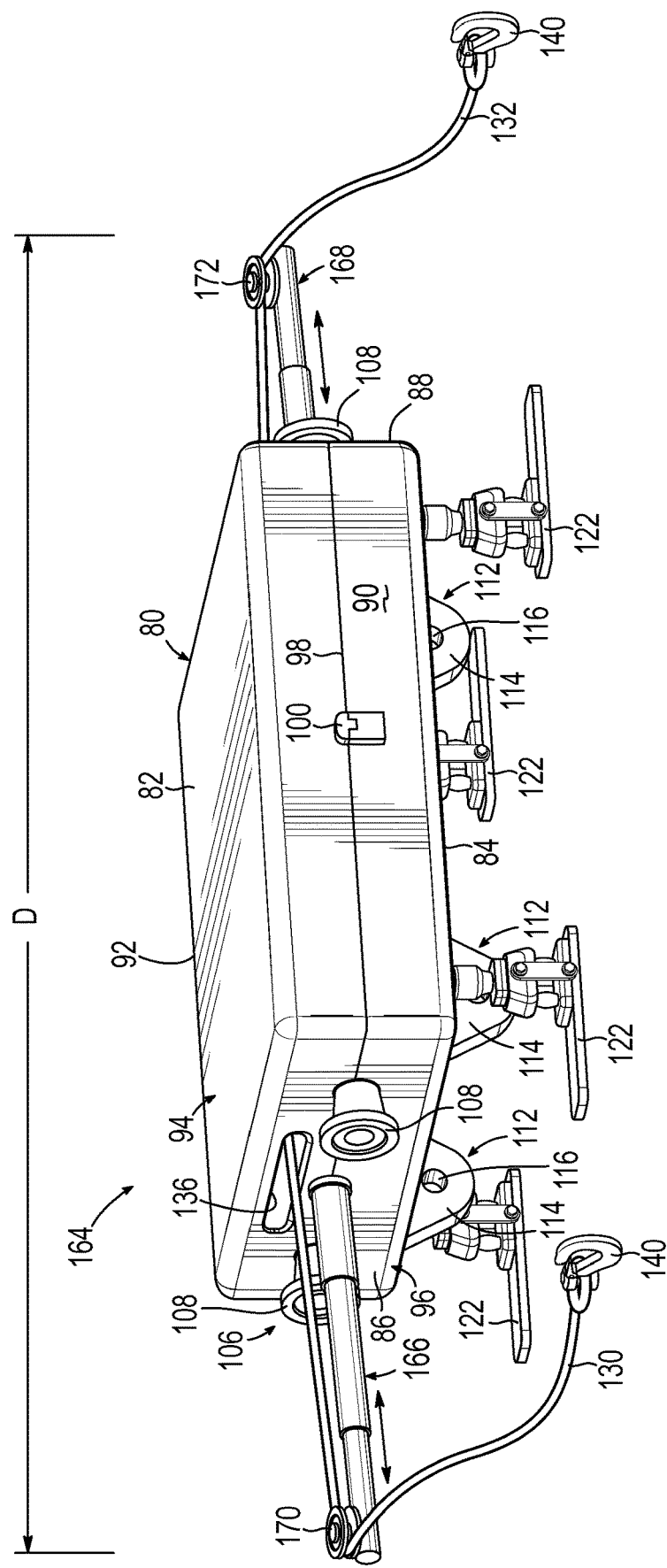
FIG. 6 is a perspective view of tagline control module in accordance with another embodiment of the invention.

Another embodiment of a tagline control module 164 is illustrated in FIG. 6, in which like reference numbers refer to like features in the preceding figures. The tagline control module 164 is similar to that shown in FIG. 2 and thus only the differences will be described in further detail. In this regard, the housing 80 of the tagline control module 164 includes a pair of arms 166, 168 extending from the housing 80. In the illustrated embodiment, the arms 166, 168 extend from the side walls 86, 88 of the housing 80, respectively. In one embodiment, the arms 166, 168 may be selectively extended or retracted relative to the housing 80. For example, the arms 166, 168 may be configured as telescoping arms having suitable motors or other actuators for controlling the extension/retraction of the arms 166, 168. In this regard, the arms 166, 168 may be operatively coupled to the controller 146 in the tagline control module 74 for controlling the extension/retraction of the arms 166, 168.

Each of the arms 166, 168 has a first end generally fixed to the housing 80 and a second terminating end that includes a pulley 170, 172. As illustrated in FIG. 6, the tagline cables 130, 132 extend from the respective side walls 86, 88 via slots 136, 138 (only slot 136 shown in FIG. 6) and are configured to engage with pulleys 170, 172 at the ends of the respective arms 166, 168. The purpose of the arms 166, 168 is to increase the distance D between the tagline cables 130, 132 at the point where the tagline cables 130, 132 effectively extend from the tagline control module 74. In the embodiment shown in FIG. 2, the distance D is limited by the width of the housing 80. In the embodiment shown in FIG. 6, however, the distance D is controlled by the length of the arms 166, 168. As can be appreciated, the greater the distance D, the more control the tagline control system 72 can exert on the position of the wind turbine component 70. Thus, the embodiment shown in FIG. 6 provides a greater degree of control over the wind turbine component 70 as compared to that shown in FIG. 2. In an exemplary embodiment, the arms 166, 168 may be positioned such that the tagline cables 130, 132 form an equilateral triangle near the assembly position of the wind turbine component 70 to the wind turbine 10. In any event, operation of the tagline control module 164 is similar to that described above in reference to tagline control module 74.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A tagline control system for handling a wind turbine component during an operation on a wind turbine using a lifting apparatus, comprising
 a tagline control module configured to be positioned intermediate a connector of the lifting apparatus and the wind turbine component being lifted, the tagline control module comprising:
  a housing;
  at least two winches disposed within the housing, each winch having a tagline cable operatively coupled to the winch;
  a controller disposed within the housing and operatively coupled to the at least two winches, the tagline cables of the winches configured to be reeled in or paid out by their respective winches under the control of the controller; and
  a power source disposed within the housing and operatively coupled to the at least two winches.

2. The tagline control system according to claim 1, further comprising a guide member, the guide member configured to be operatively coupled to the tagline cables of the tagline control module to effectuate a positional change in the wind turbine component during use.

3. The tagline control system according to claim 2, wherein the guide member comprises one or more guide cables or a guide rail.

4. The tagline control system according to claim 3, wherein the guide member further comprises a pulley block configured to traverse along a length of the one or more guide cables.

5. The tagline control system according to claim 2, wherein the guide member is configured to be coupled to the lifting apparatus.

6. The tagline control system according to claim 5, wherein the lifting apparatus is a crane and the guide member is configured to be coupled to one or more booms of the crane.

7. The tagline control system according to claim 2, wherein the guide member is configured to be coupled to the wind turbine.

8. The tagline control system according to claim 7, wherein the wind turbine includes a tower and a nacelle, and the guide member is configured to be coupled to the tower or the tower and nacelle.

9. The tagline control system according to claim 2, wherein the guide member includes a first guide member portion configured to be coupled to the lifting apparatus and a second guide member portion configured to be coupled to the wind turbine, and wherein the tagline control module is configured to be operatively coupled to each of the first and second guide member portions.

10. The tagline control system according to claim 1, wherein the tagline control module further comprises a pair of arms extending from the housing and configured to engage with a respective tagline cable.

11. The tagline control system according to claim 10, wherein the pair of arms are selectively extendable and retractable relative to the housing.

12. The tagline control system according to claim 11, wherein the pair of arms are operatively coupled to the controller for controlling the extension and retraction of the arms.

13. The tagline control system according to claim 1, further comprising one or more sensors configured to be coupled to the wind turbine component and in communication with the controller in the tagline control module, the one or more sensors configured to communicate positional information of the wind turbine component to the controller.

14. A method of handling a wind turbine component during an operation on a wind turbine using a lifting apparatus, comprising:
 providing a tagline control system, the tagline control system comprising a tagline control module and a guide member, the tagline control module including a housing having at least two winches each winch having a tagline cable operatively coupled thereto, a controller, and a power source;
 coupling the tagline control module to a connector of the lifting apparatus and to the wind turbine component so that the tagline control module is positioned between the connector and the wind turbine component;
 coupling the guide member to a guide support;
 coupling the tagline cables to the guide member; and
 operating the tagline control system to effectuate a positional change in the wind turbine component.

15. The method according to claim 14, wherein the coupling of the guide member to the guide support further comprises coupling one or more guide cables to the lifting apparatus.

16. The method according to claim 15, wherein the lifting apparatus includes a crane having one or more booms, and the method further comprises coupling the one or more guide cables to the one or more booms of the crane.

17. The method according to claim 14, wherein the coupling of the guide member to the guide support further comprises coupling one or more guide cables to the wind turbine.

18. The method according to claim 17, wherein the wind turbine includes a tower and a nacelle, and the guide member is configured to be coupled to the tower or to the tower and the nacelle.

19. The method according to claim 14, wherein the coupling of the guide member to the guide support further comprises coupling one or more guide cables to the lifting apparatus and coupling one or more guide cables to the wind turbine.

20. The method according to claim 14, wherein the tagline control module includes a pair of adjustable arms, wherein the arms are in engagement with a respective tagline cable, the method further comprising adjusting the length of the arms.

21. The method according to claim 14, further comprising:
 sensing a position of the wind turbine component; and
 automatically adjusting the position of the wind turbine component in response to the sensing using the tagline control system.

22. The method according to claim 21, wherein sensing the position of the wind turbine component further comprises:
 placing one or more sensors on the wind turbine component; and operatively coupling the one or more sensors to the controller in the tagline control module.

23. The method according to claim 21, further comprising:
predefining a design criteria for the position of the wind turbine component; and
automatically adjusting the position of the wind turbine component to maintain or achieve the design criteria using the tagline control system.

24. The method according to claim 23, further comprising:
storing a plurality of design criteria in the controller; and
selecting a design criteria from the plurality of design criteria.

* * * * *